(12) United States Patent
Palanisamy et al.

(10) Patent No.: US 6,242,886 B1
(45) Date of Patent: Jun. 5, 2001

(54) APPARATUS AND METHOD FOR AUTOMATIC RECOVERY OF SULFATED LEAD ACID BATTERIES

(75) Inventors: Thirumalai G. Palanisamy, Morris Township, Morris County; Harmohan Singh, Rockaway, both of NJ (US); Bernard P. Gollomp, Palisades, NY (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/426,372

(22) Filed: Oct. 25, 1999

Related U.S. Application Data

(60) Provisional application No. 60/128,891, filed on Apr. 12, 1999.

(51) Int. Cl.[7] .................................................. H01M 6/50
(52) U.S. Cl. ........................................... 320/100; 320/132
(58) Field of Search .................................... 320/100, 132, 320/161, 162, 134

(56) References Cited

U.S. PATENT DOCUMENTS

| | | | |
|---|---|---|---|
| 5,063,341 | 11/1991 | Gali | 320/160 |
| 5,592,068 | 1/1997 | Gregory et al. | 320/140 |
| 5,672,951 | 9/1997 | Shiota | 320/132 |
| 5,680,050 | 10/1997 | Kawai et al. | 324/427 |
| 5,705,929 | 1/1998 | Caravello et al. | 324/430 |
| 5,721,688 | 2/1998 | Bramwell | 320/128 |
| 5,767,659 | * 6/1998 | Farley | 320/150 |
| 5,886,503 | * 3/1999 | McAndrews et al. | 320/132 |

* cited by examiner

Primary Examiner—Peter S. Wong
Assistant Examiner—Pia Tibbits
(74) Attorney, Agent, or Firm—Loria B. Yeadon

(57) ABSTRACT

Apparatus and method for automatic recovery of sulfated lead acid batteries rely on monitoring battery voltage, current and internal resistance during battery charging. The lead acid battery is recovered for usage by measuring the internal resistance to see if it is so high such that the battery is unrecoverable, or so low such that the normal charging methods can be used. If the internal resistance is between the two limits, the battery receives a first constant charge current. As the lead acid battery is being charged slowly by a constant charge current, the battery voltage is measured. The decrease in the internal resistance (IR) of the battery causes the battery voltage to decrease during charging, while the charging causes the battery voltage to increase. According to the present invention, if it is detected that the battery voltage has reached the minimum voltage and begun to increase in a predetermined period of time, the charge current is substantially increased (e.g., doubled) because the capability of the lead acid battery to accept a higher charge current has increased. As the charge current is increased, the recovery and charging of the lead acid battery are advantageously more expedient and efficient.

36 Claims, 9 Drawing Sheets

APPARATUS AND METHOD FOR AUTOMATIC RECOVERY OF SULFATED LEAD ACID BATTERIES

RELATED APPLICATIONS

The present application claims the priority of U.S. Provisional Application Ser. No. 60/128,891, entitled APPARATUS AND METHOD FOR AUTOMATIC RECOVERY OF SULFATED LEAD ACID BATTERIES, filed on Apr. 12, 1999, the entirety of which is incorporated by reference herein.

FIELD OF THE INVENTION

The present invention relates generally to lead acid batteries, and in particular, relates to an apparatus and method for automatic recovery of sulfated lead acid batteries.

BACKGROUND OF THE INVENTION

A battery is a device that converts the chemical energy contained in its active materials directly into electrical energy by means of an oxidation-reduction electrochemical reaction. This type of reaction involves the transfer of electrons from one material to another. Batteries in the art commonly utilize electrochemical operations to store and release electrical energy.

FIG. 1 illustrates the electrochemical operation of a typical battery. Referring to FIG. 1, the negative electrode (anode 2) is the component capable of giving up electrons, being oxidized during the reaction. It is separated from the oxidizing material, which is the positive electrode (cathode 1), the component capable of accepting electrons. The transfer of electrons takes place in the external circuit 11 connecting the two materials and in the electrolyte 3, which provides an ionic medium for the electron transfer in the battery 4.

Certain types of batteries are rechargeable, such as lead acid batteries. A lead acid battery uses sponge lead for the negative electrode (anode 2), lead oxide for the positive electrode (cathode 1), and a sulfuric acid solution for the electrolyte 3. The lead acid battery 4 is left in a charged condition when it is not being used. During discharge, the active material in the lead acid battery is converted into lead sulfate and the sulfuric acid solution is diluted, i.e., its specific gravity decreases. Lead sulfate is an insulator that inhibits the proper charging of the lead acid battery 4. However, the lead acid battery 4 can be used after it is recharged.

To recover the lead acid battery, the lead sulfate is converted back to active material by charging the battery at a low current. If the lead acid battery is left in discharge for a long time, typically a few days, it becomes sulfated and difficult to recharge. The sulfated lead acid battery is discarded if it is not recoverable, which is wasteful and harmful to the environment.

Therefore, there is a general need in the art for an improved apparatus and method of recovering lead acid batteries. An efficient apparatus and method for recovering lead acid batteries, that avoids unnecessary waste, is needed.

SUMMARY OF THE INVENTION

The lead acid battery is stored by placing it in a charged condition when it is not in use. In storage, self-discharge occurs which causes the battery voltage to decrease. The internal resistance increases when the battery is left in storage for a long period of time due to the growth of lead sulfate crystals, especially if the battery is stored in a discharged condition. The lead acid battery is recovered for usage by charging the battery with a low constant current. As the lead acid battery is being charged slowly by a constant charge current, the battery voltage during charging approaches a minimum voltage in the battery recovery process. Then, the battery voltage gradually increases as the lead acid battery is being charged. As the recovery process is being implemented, the sulfate in the lead acid battery is converted to active material which also causes the battery voltage to decrease due to decreasing IR drop voltage. Due to the charging which causes the conversion of lead sulfate to the active material, the battery voltage increases.

According to the present invention, when it is detected that the battery voltage has reached the minimum voltage and begun to increase, the charge current is substantially increased (e.g., doubled) because the capability of the lead acid battery to accept a higher charge current has increased. As the charge current is increased, the recovery and charging of the lead acid battery are advantageously more expedient and efficient.

In an illustrative embodiment of the present invention, the internal resistance of the battery is measured. If it is above a recoverable limit, e.g., 5 ohms ($\Omega$), it is discarded. If it is below a normal limit, e.g., 0.2 ohms ($\Omega$), it is subjected to normal charging. If it is between these limits, the electrolyte level is checked and corrected if it is low. Then, a controlled charge of current, e.g., 0.5 amperes (A), is sent to charge the battery and the battery voltage is measured and compared to a minimum voltage. If the battery reaches the minimum within a preset time interval, e.g., one hour, the charge is increased, e.g., doubled. A test is then made to see if the charge current has exceeded a current limit. If it has not exceeded the current limit, the battery voltage is measured at the new level and, if it reaches another minimum, the charge is increased again. This is repeated until the battery has been charging for another time period, e.g., eight hours, or the current limit is reached, indicating that the battery recovery is completed and the battery is no longer sulfated. Then, normal charging is used to make the battery ready for use.

In another embodiment, if the battery voltage continues to increase after the predetermined period, the charging is stopped for a short period of time, e.g., five minutes, and then the process is repeated from the point of checking to see if the charge current has exceeded the limit. If the voltage is decreasing or remains the same, a check is made to see if the battery has reached the minimum and begun to increase. If it has, the charging is stopped for a second period of time, e.g., five minutes. Then, the process begins from the beginning, i.e., by measuring the internal resistance.

In an embodiment of the apparatus of the present invention, a computer or microprocessor is programmed to implement the process steps (as illustrated in the various embodiments herein) of the method of the present invention. The method steps can be advantageously reconfigured by reprogramming the computer or microprocessor, e.g., to implement a voltage control method as opposed to the embodiments in which the battery is charged by a controlled charge current.

In an embodiment of the voltage control method of the present invention, the lead acid battery is charged by a controlled charge voltage. The charge voltage is increased if the internal resistance of the battery is within a recoverable range. The charge voltage is increased until the battery current reaches a first current limit. Then, the battery is charged until the battery current reaches a second current limit, at which point the charge voltage is decreased. The charge voltage is also compared with a preset limit. The process steps of the voltage control method of the present invention are repeated until the charge voltage falls below the preset limit, at which point the battery is charged using normal charging. After the normal charging is complete, the battery is available for use.

BRIEF DESCRIPTION OF THE DRAWINGS

Other features and advantages of the invention will be apparent from the following detailed description when read in conjunction with the accompanying drawings, in which like reference designations represent like features throughout the enumerated Figures. The drawings referred to herein will be understood as not being drawn to scale except if specifically noted, the emphasis instead being placed upon illustrating the principles according to the present invention. In the accompanying drawings.

DETAILED DESCRIPTION OF THE PREFERRED EMBODIMENTS

Figure 1:
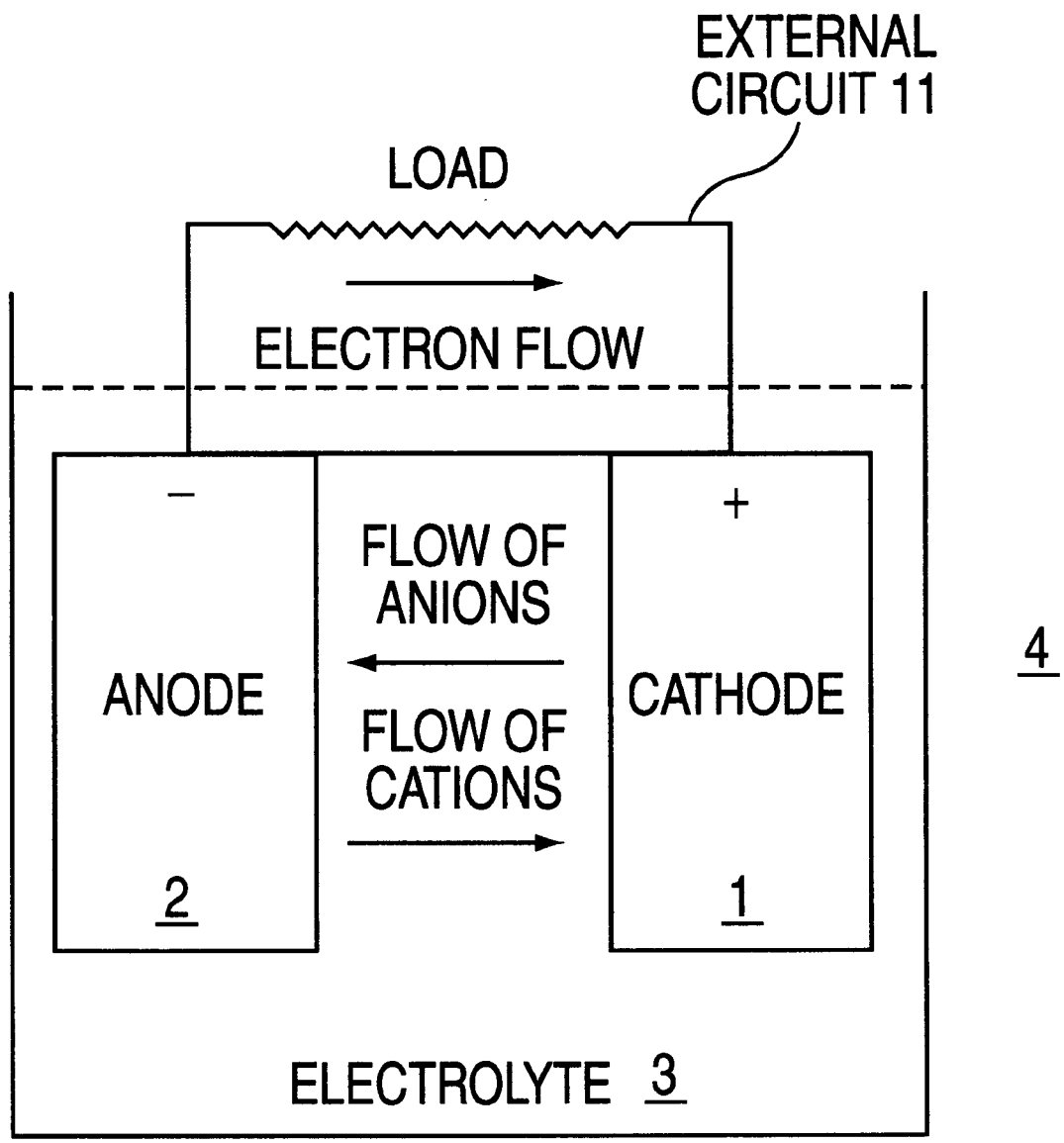
FIG. 1 illustrates the conventional operation of a lead acid battery.
Figure 2:
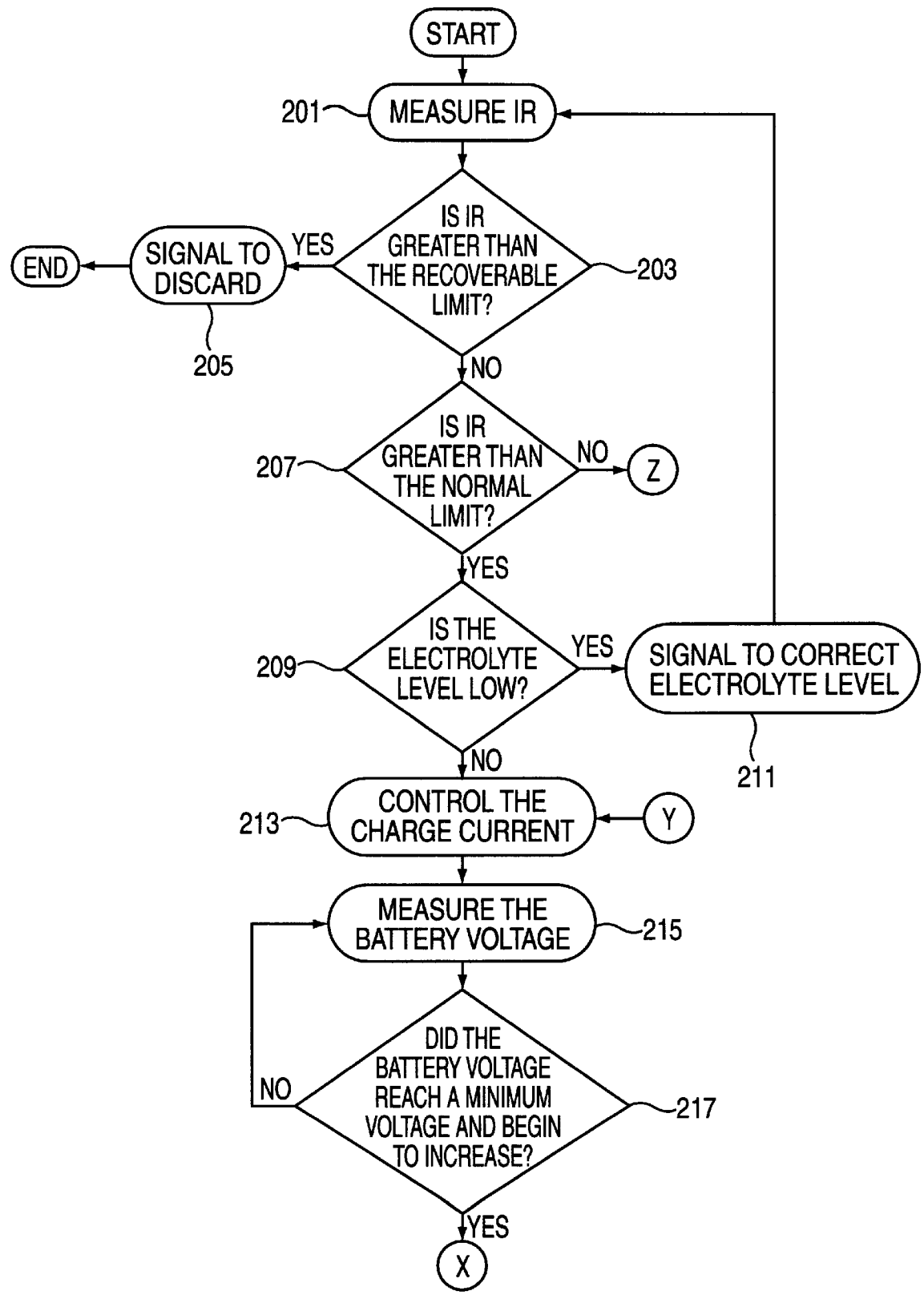
FIGS. 2 and 2A are a flow diagram illustrating an embodiment of the current control method of the present invention.

FIG. 2 is a flow diagram illustrating an embodiment of the current control method of the present invention. Referring to FIG. 2, the internal resistance (IR) of the lead acid battery is measured (step 201). The IR is checked against a recoverable limit in step 203. If the IR of the battery is greater than the recoverable limit, e.g. 5 ohms (Ω), the battery is unrecoverable and a signal is sent to discard the battery or warn that the battery should be discarded (step 205). If the IR of the battery is not greater than the recoverable limit, the control flow is directed to step 207.

The IR is checked against a normal limit in step 207. If the IR is not greater than the normal limit, e.g., 0.2 ohms (Ω), the battery only requires normal charging to place it into condition for use, and the control flow is directed to step 223. Normal charging of the battery is implemented in step 223, in which various charging methods can be used, such as pulse current charging, constant current charging and constant voltage charging, which are known in the art. After the lead acid battery is charged, it is available for use. If the IR is greater than the normal limit, the control flow is directed to step 209.

The electrolyte level of the battery is checked in step 209. If the electrolyte level is low, i.e., the electrolyte level is below an acceptable level, a signal is sent in step 211 to correct the electrolyte level, e.g., by adding water or electrolyte into the battery. The control flow is then looped back to step 201 where the IR of the battery is measured again.

If the electrolyte level is not low, i.e., it is above an acceptable level, a controlled charge current, preferably 1 ampere (A) or less, is passed to charge the battery in step 213. As the battery is being charged, the battery voltage is measured (step 215) for a preset period of time. The battery voltage is compared with a minimum voltage in step 217. If the battery voltage has not reached a minimum voltage (after which it began to increase), the control flow is looped back to step 215 where the battery voltage is measured again. If the battery voltage has reached a minimum voltage, after which it has been increasing for a preset time interval, then the control flow is directed to step 219, where the charge current is increased, e.g., by 50 or 100 percent.

Step 221 checks to see whether the charge current has exceeded a current limit. If the charge current (after the increase in step 219) does not exceed the current limit, then the control flow is looped back to step 213 where the controlled charge current continues to charge the battery and the process steps beginning at step 213 are repeated, i.e., the charge is increased and the voltage measured. If the charge current exceeds the current limit, then the recovery is complete and the battery is no longer sulfated. After normal charging (step 223), the battery is available for use.

Figure 2A:
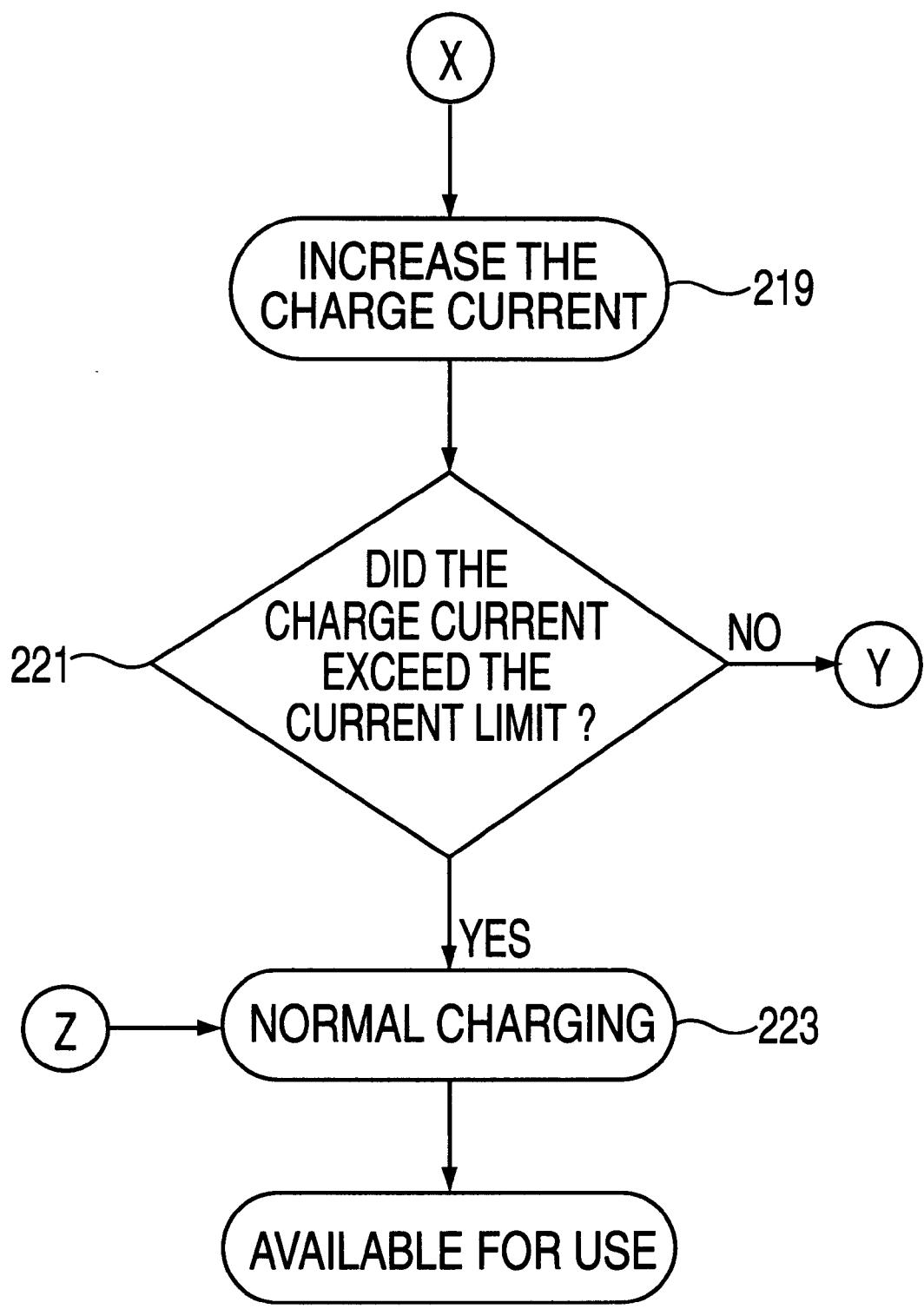

FIG. 2A is a graph illustrating the battery voltage response of a battery charged using the method of the present invention. The graph, as shown in FIG. 2A, illustrates the relationship of the battery voltage and the charge current over a period of time. At time t1, the battery is charged with an initial current of 0.5 A. The battery voltage drops to a minimum and then slowly rises until t2. The charge current is increased to 1 A, according to the method of the present invention, in response to the behavior of the battery voltage before t2. Thereafter, the battery voltage drops due to the IR decrease during the conversion to the active material, and then stabilizes to a relatively constant voltage followed by a low rise in voltage until t3. Because of the increased charge current, the battery voltage is higher after t2 than before t2. The sharp rise in voltage at t2 is due to increased IR drop voltage caused by the current increase at t2. Similarly, at t3, t4 and t5, the battery voltage drops to a minimum and then sharply rises, and the charged current is increased accordingly to 2 A, 4 A and 8 A, respectively. An advantage of the method of the present invention is that the battery can be quickly charged by substantially increasing the charge current once a specific behavior of the battery voltage is detected, as opposed to slowly charging the battery with a low, constant current. Furthermore, the method of the present invention is particularly advantageous because it can be entirely implemented in an automated fashion in programmable software in a computer that controls the recovery and charging of sulfated lead acid batteries.

Figure 3:
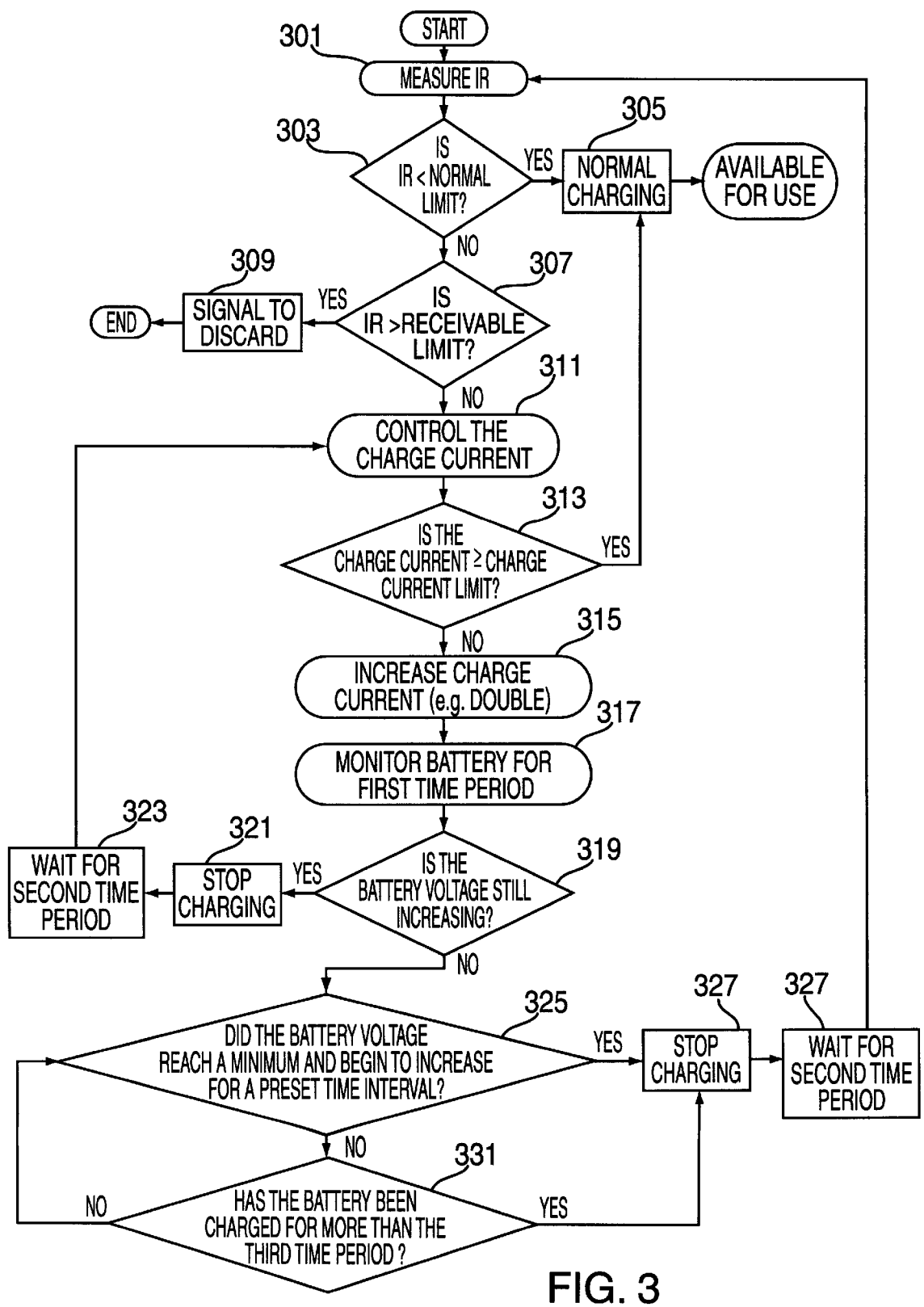
FIG. 3 is a flow diagram that illustrates another embodiment of the current control method of the present invention.

FIG. 3 is a flow diagram that illustrates another embodiment of the current control method of the present invention. Referring to FIG. 3, the IR of the lead acid battery is measured (step 301). The IR is checked against a normal limit in step 303. If IR is less than the normal limit, e.g., 0.2 ohms (Ω), the lead acid battery is not sulfated. The battery is recovered by normal charging using conventional charging methods as previously discussed (step 305). After the normal charging is complete, the battery is available for use.

If IR is not less than the normal limit, then the control flow is directed to step 307 where IR is tested against a recoverable limit. If IR is greater than the recoverable limit, e.g., 5 ohms (Ω), the battery is unrecoverable and a signal is sent to discard or warn that the battery should be discarded (step 309). If the IR of the battery is not greater than the recoverable limit, a controlled charge current is passed to charge the battery in step 311. The charge current is tested against a charge current limit in step 313. If the charge current is greater than or equal to the charge current limit, e.g., 8 amperes (A), the recovery is complete and the battery is charged in step 305 using normal charging methods (as discussed above). After normal charging is complete, the battery is available for use.

If the charge current is less than the charge current limit, then the charge current is increased, e.g., by 50 or 100 percent (step 315). As a result, the battery voltage gradually increases. The lead acid battery is monitored for a first time period (up to one hour in the present embodiment) in step 317. If the battery voltage is still increasing after the first time period has expired, the charging is discontinued in step 321. A second time period (five minutes in the present embodiment) is allowed to lapse (step 323) and the control flow is looped back to step 311, where the process steps starting at step 311 are repeated. If the battery voltage is decreasing or remains the same, it is determined in step 325 whether the battery voltage of the lead acid battery has reached a minimum voltage and begun to increase for a time interval. If the battery voltage has reached a minimum voltage and begun to increase, the charging is discontinued in step 327. The second time period is allowed to lapse (step 329) and the control flow is looped back to step 301, where the IR of the battery is measured and the process steps starting at step 301 are repeated.

If the battery voltage has not reached a minimum voltage, it is determined in step 331 whether the lead acid battery has been charging for more than a third time period, e.g., eight hours in the present embodiment. If the charging has not lasted for more than 8 hours, the control flow is reverted back to step 325. If the battery has been charging for more than 8 hours, the charging is discontinued in step 327. The second time period (e.g., five minutes) is allowed to lapse (step 329) and the control flow is looped back to step 311 (via C), where the process steps starting at 311 are repeated.

Figure 4:
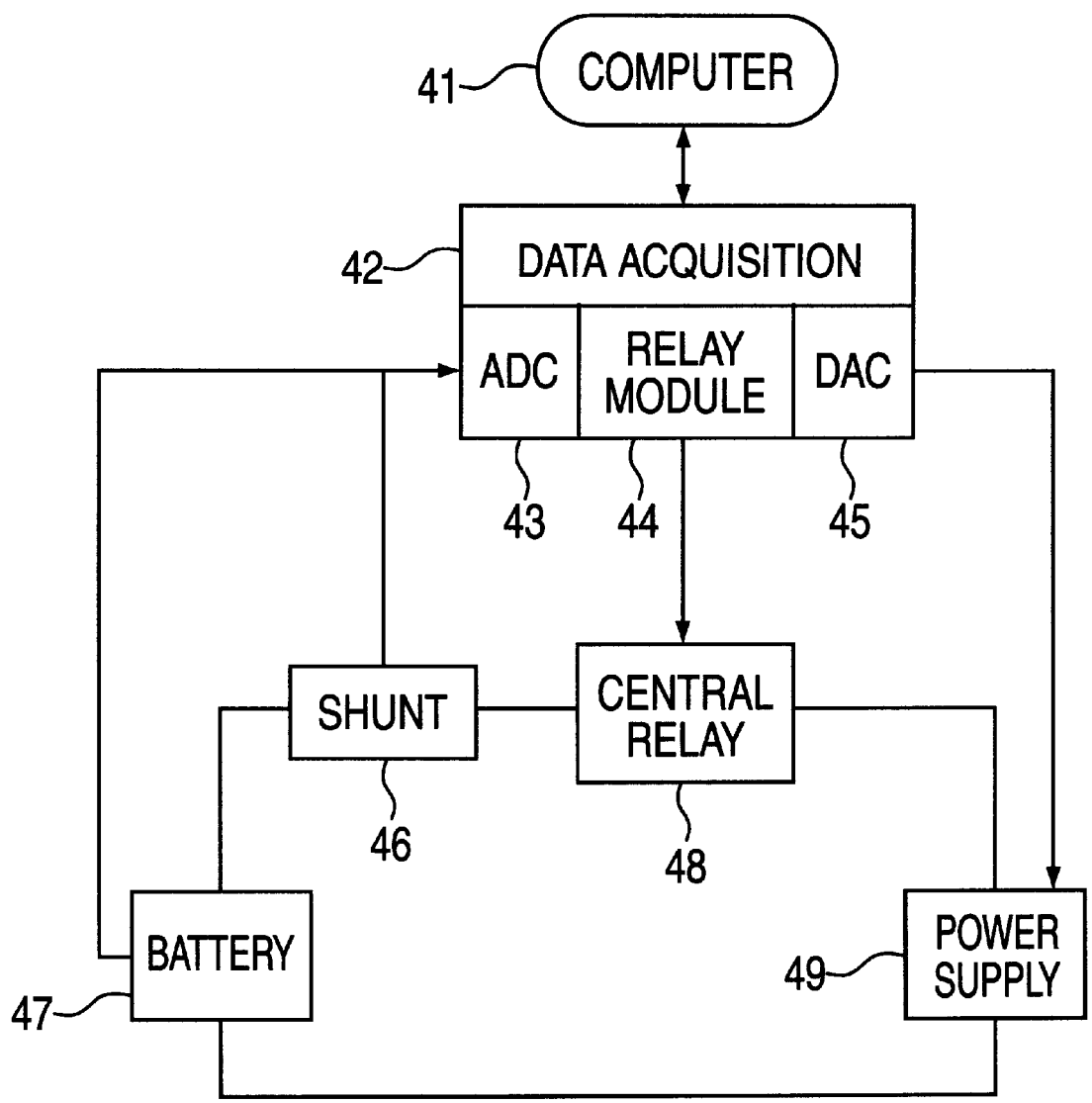
FIG. 4 is a diagram that generally illustrates an embodiment of the apparatus of the present invention.

FIG. 4 is a block diagram that generally illustrates an embodiment of the apparatus for carrying out the invention. Referring to FIG. 4, programmed device 40 stores the process steps of the method of the present invention and computer or microprocessor 41 implements the process steps including those embodied in FIGS. 2, 3 and 5. The method steps are programmed into programmed device 40, which can be reconfigured by rewriting or reprogramming the software in programmed device 40. Computer 41 is connected to data acquisition device 42, which processes the data from battery 47 into a form useful for the computer 41 using methods such as analog-to-digital conversion, digital-to-analog conversion, amplification or noise reduction. Through data acquisition device 42, computer 41 directs the charging of battery 47 by measuring the internal resistance (IR), voltage and current of battery 47, as well as controlling the charge current and the charge voltage from a power supply 49. The data acquisition device 42 collects IR, battery current or voltage data for computer 41 via analog-to-digital converter (ADC) 43, which converts the data from analog to digital form, and processes the data from battery 47 into a form useful for computer 41. Shunt 46, which measures the charge current, forwards the charge current data to computer 41 via ADC 43 and data acquisition device 42. Computer 41 can stop the charging of battery 47 for a period of time by discontinuing the transmission of the charge current from power supply 49. Computer 41 can also direct the charging of battery 47 by controlling the charge current or charge voltage supplied by power supply 49. Computer 41 can control power supply 49 by sending instructions via data acquisition device 42 and a digital-to-analog converter (DAC) 45 which converts digital signals from computer 41 into an analog form which can control power supply 49. Control relay 48 can implement normal charging (as discussed above), such as current pulse charging, or place battery 47 in an open circuit by closing or opening in response to instructions by computer 41. Computer 41 has control over control relay 48 by sending instructions thereto via relay module 44. Control relay 48 acts like a switch by putting the battery in open circuit for a period of time (e.g., 5 minutes).

An embodiment of the operation of the apparatus of the present invention as shown in FIG. 4 is described herein in conjunction with FIG. 3. In particular, battery 47 sends IR data to computer 41 via ADC 43, which converts the IR data from analog to digital form, and data acquisition device 42, which reduces the noise in the IR data and amplifies it for use by computer 41. Computer 41 checks the IR of battery 47 against a normal limit. If IR is less than the normal limit, e.g., 0.2 ohms ($\Omega$), battery 47 is not sulfated. Computer 41 then directs control relay 48 and power supply 49 to use normal charging to recover battery 47 using conventional charging methods as previously discussed (step 305). After the normal charging is complete, battery 47 is available for use.

Referring to step 307, the IR of battery 47 is not less than the normal limit, then computer 41 checks the IR against a recoverable limit, e.g., 5 ohms ($\Omega$), which is dependent on the output capacity of power supply 49. If the IR is greater than the recoverable limit, battery 47 is unrecoverable and computer 41 sends a signal to discard or warn that the battery should be discarded (step 309). If the IR is not greater than the recoverable limit, computer 41 instructs power supply 49 to send a controlled charge current to charge battery 47 (step 311). Computer 41 checks the charge current against a charge current limit (step 313). If the charge current is greater than or equal to the charge current limit, e.g., 8 amperes (A), the recovery is complete and computer 41 instructs control relay 48 and power supply 49 to charge battery 47 (step 305) using normal charging methods (as discussed above). After normal charging is complete, battery 47 is available for use.

If the charge current is less than the charge current limit, then computer 41 instructs power supply 49 to increase the charge current, e.g., by 50 or 100 percent (step 315). As a result, the battery voltage gradually increases. computer 41 monitors battery 47 for a first time period, e.g., for one hour in the present embodiment (step 317). Battery 47 continues to send battery voltage data to computer 41 via ADC 43 and data acquisition device 42. If the battery voltage is still increasing after the first time period has expired, computer 41 instructs power supply 49 to stop charging battery 47 (step 321). Computer 41 waits for a second time period, e.g., five minutes, to lapse (step 323), then repeats the process steps starting at step 311. If the battery voltage of battery 47 is decreasing or remains the same, computer 41 checks to see whether the battery voltage of battery 47 has reached a minimum voltage and begun to increase for a time interval (step 325). If the battery voltage has reached a minimum voltage and begun to increase, computer 41 instructs power supply 49 to stop charging battery 47 (step 327). Computer 41 waits for the second time period (e.g., five minutes) to lapse (step 329). Computer 41 then repeats the process steps starting at step 301.

If the battery voltage has not reached a minimum voltage, then computer 41 determines whether power supply 49 has been charging battery 47 for more than a third time period, e.g., eight hours (step 331). If the charging has not lasted for more than 8 hours, computer 41 repeats the process steps starting at step 325. If the battery has been charging for more than 8 hours, computer 41 instructs power supply 49 to stop charging battery 47 (step 327). Computer 41 waits for the second time period, e.g., five minutes, to lapse (step 329), and then repeats the process steps starting at step 311.

Figure 4A:
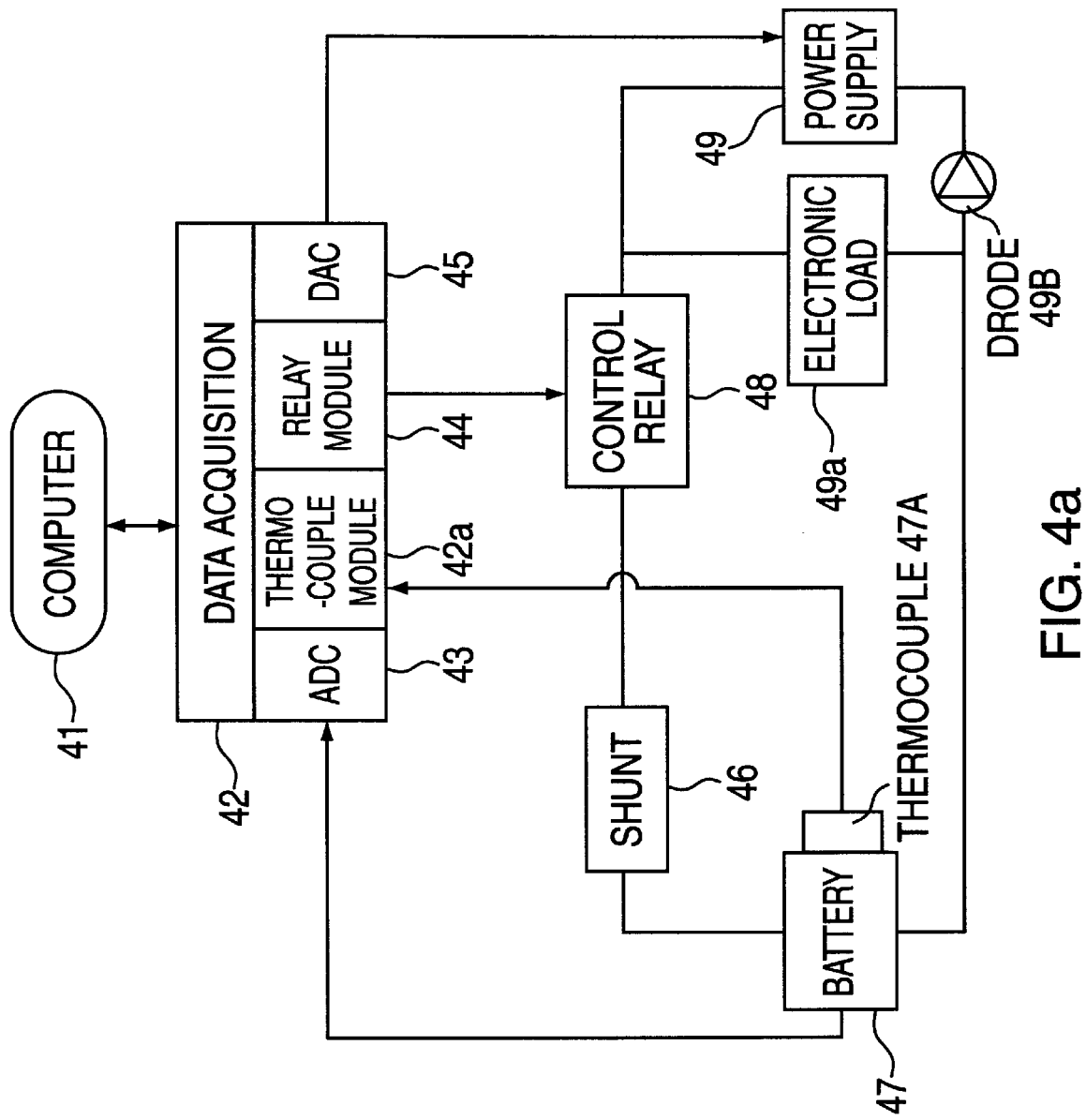
FIG. 4A is a diagram that illustrates a further embodiment of the apparatus of the present invention.

FIG. 4A is another embodiment of the apparatus of the present invention. The apparatus of the present invention as shown in FIG. 4A includes thermocouple module 42A, thermocouple 47A, electronic load 49A, and diode 49B, which are elements additional to the apparatus as shown in FIG. 4. The apparatus of FIG. 4A essentially performs the same functions as the one shown in FIG. 4, except functions performed by thermocouple module 42A, thermocouple 47A, electronic load 49A, and diode 49B. Computer or microprocessor 41 can monitor the battery temperature of battery 47 using thermocouple 47A (via thermocouple module 42A). Computer 41 can stop charging battery 47 if the battery temperature measured by thermocouple 47A is too hot, e.g., exceeds a tolerable limit. Moreover, electronic module 49A can discharge battery 47, and diode 49B can protect power supply 49 by stopping the current into power supply 49 from battery 47 when the power supply voltage is low or when the electrical power to power supply 49 fails.

The present invention is particularly advantageous because its process steps can be implemented in computer or microprocessor 41 in an automated fashion, and can be reconfigured by reprogramming the programmed device 40. Computer or microprocessor 41 can also be programmed (vis-a-vis the programmed device 40) to charge battery 47 with a controlled charge voltage, instead of the current control method in various embodiments as shown in FIGS. 2 and 3.

Figure 5:
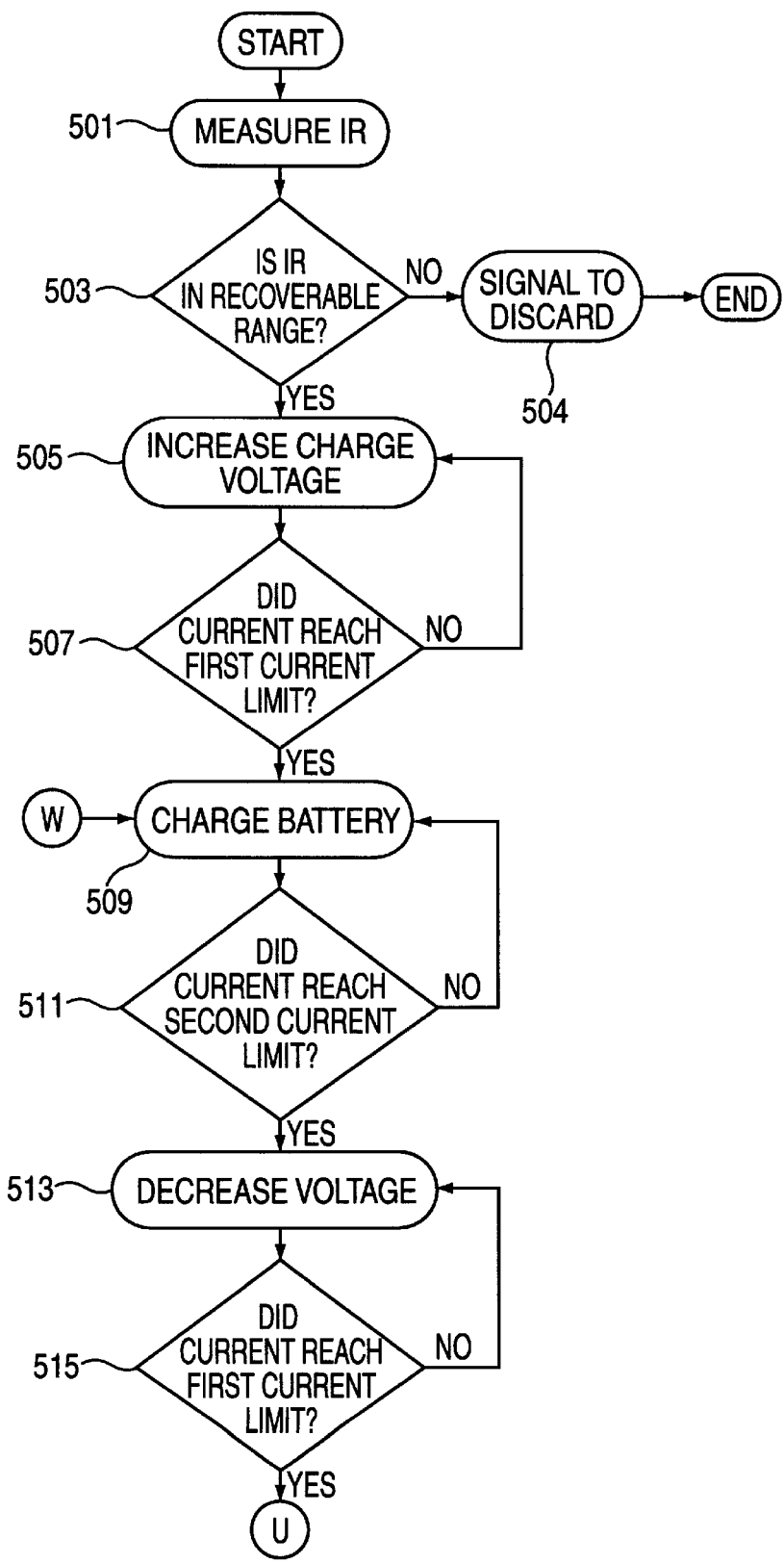
FIGS. 5 and 5A are flow diagram that illustrates an embodiment of the voltage control method of the present invention.
Figure 5A:
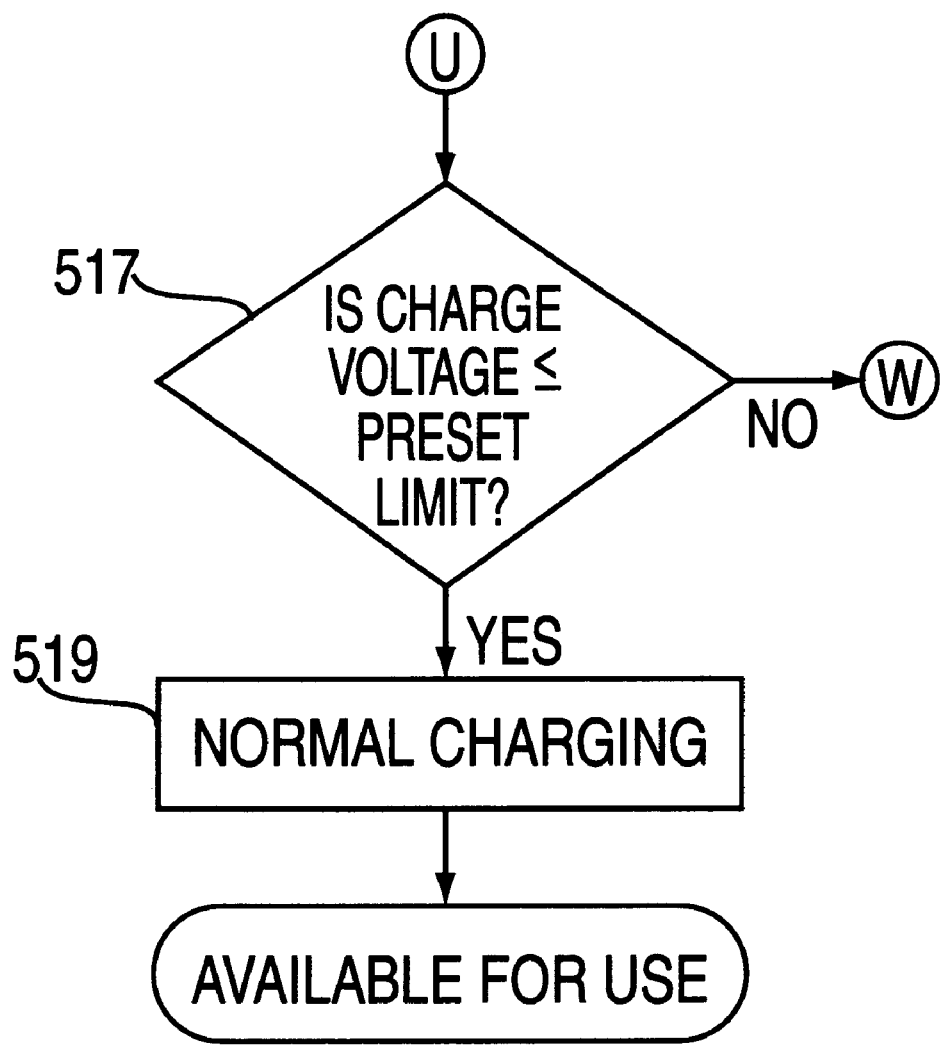

FIG. 5 is a flow diagram that illustrates another embodiment of the voltage control method of the present invention. Referring to FIG. 5, the internal resistance (IR) of the lead acid battery is measured (step 501). It is determined in step 503 if the IR is in a recoverable range, e.g., between 0.2 to 5 ohms ($\Omega$). If the IR is not within the recoverable range, the battery is unrecoverable and a signal is sent to discard or warn that the battery should be discarded (step 504). If the IR of the battery is within the recoverable range, the charge voltage is increased (step 505). Step 507 checks the battery current against a first current limit. If the battery current has not reached the first current limit, then the control flow reverts back to step 505 where the charge voltage is further increased and the process steps starting at step 505 are repeated. If the battery current has reached the first current limit, the battery is charged with the increased voltage (step 509).

Step 511 checks the battery current against a second current limit. If the battery current has not reached the second current limit under a constant charge voltage, then the control flow reverts back to step 509 where the battery is charged with the charge voltage and the process steps starting at step 509 are repeated. If the battery current has reached the second current limit, the charge voltage is decreased in step 513.

Step 515 checks the battery current against the second current limit. If the battery current has not reached the first current limit, then the control flow reverts back to step 513 where the charge voltage is decreased and the process steps starting at step 513 are repeated. If the battery current has reached the first current limit, the control flow is directed to step 517.

Step 517 checks the charge voltage against a preset limit. If the charge voltage is greater than the preset limit, the control flow reverts back to step 509 where the battery is charged and the process steps beginning at step 509 are repeated. If the charge voltage is less than or equal to the preset limit, normal charging (as discussed above) is performed on the battery in step 519. After the normal charging is complete, the battery is available for use.

The method and apparatus of the present invention can be used in any application that utilizes lead acid batteries, such as automotive starting, lighting, ignition, (SLI), lawnmowers, tractors, marine, float service. Other applications include motive power, stationary, or sealed battery uses, such as industrial trucks, materials handing, submarine power, emergency power, utilities, uninterruptible power supply (UPS), television, portable tools, lights, home appliances, radios, cassette and compact disc players, etc.

The foregoing embodiments demonstrate methods and devices implemented and contemplated by the inventors in making and carrying out the invention. While the invention has been particularly shown and described with reference to the preferred embodiments thereof, the embodiments are not intended to be exhaustive or to limit the invention to the precise forms disclosed herein. It will be understood by those skilled in the art that various changes in form and detail may be made therein without departing from the spirit and scope of the invention. Numerous equivalent methods, devices, and teclniques may be employed to achieve the same result. Similarly, any process steps described may be interchangeable with other steps in order to achieve the same result. It is intended that the scope of the invention is defined by the following claims and their equivalents.

We claim:

1. A method for selecting the discarding or recovery of a rechargeable battery that has an internal resistance of a normal limit value and a recoverable limit value, comprising the steps of:

measuring the battery internal resistance;

indicating that the battery is to be discarded if the measured internal resistance exceeds the recoverable limit value; and charging the battery with current if the measured internal resistance is greater than said normal limit and less than said recoverable limit.

2. The method of claim 1, wherein the recoverable limit value is 5 ohms.

3. The method of claim 2, wherein the normal limit is 0.2 ohms.

4. The method of claim 1 wherein said charging step comprises applying successively higher levels of charging current to the battery.

5. The method of claim 4 further comprising monitoring the battery voltage as the battery is charged, and said charging step comprises applying a higher level of charging current when the monitored battery voltage increases after reaching a minimum level.

6. The method of claim 4 wherein the charge current level is increased 100 percent.

7. The method of claim 5 further comprising the step of determining if a higher level charge current applied has exceeded a predetermined current limit.

8. The method of claim 7 further comprising the step of terminating recovery of a battery in which the higher level of charge current applied has exceeded a predetermined current limit and repeating the step of charging the battery and measuring its voltage.

9. The method of claim 1, further comprising the step of measuring the electrolyte level of a battery whose measured internal resistance is greater than said normal limit value and less than said recoverable limit value and signaling to correct electrolyte level of the battery if the electrolyte level is below an acceptable level, correcting the electrolyte level and then measuring the battery internal resistance.

10. The method of claim 1, further comprising the steps of:

measuring the charge current of the battery; and charging the battery using normal charging if the charge current exceeds a charge current limit.

11. The method of claim 10 further comprising the steps of:

measuring the charge current of the battery; and charging the battery at an increased amount of current if the measured charge current does not exceed a charge current limit.

12. The method of claim 11, further comprising the steps of:

monitoring the battery voltage for a first time period during charging with the increased charge current;

discontinuing the battery charging if the battery voltage continues to increase in the first time period; and charging the battery after a second time period has lapsed.

13. The method of claim 12, wherein the first time period is one hour and the second time period is five minutes.

14. The method of claim 11 further comprising the steps of:

monitoring the battery voltage for a first time period during charging with the increased current;

determining if the battery voltage does not continue to increase during the charging with the increased current; and determining if the battery voltage reached a minimum value and began to increase for a preset time interval.

15. The method of claim 14, further comprising the steps of:

discontinuing the battery charging if in the determining step the battery voltage has not reached minimum value and has begun to increase and the battery has been charged for more than a third time period; and charging the battery after a second time period has lapsed.

16. The method of claim 15, wherein the second time period is five minutes, and the third time period is eight hours.

17. The method of claim 16, further comprising the step of charging the battery using normal charging if the charge voltage is not greater than a preset limit.

18. The method of claim 17, further comprising the step of continuing the battery charging if the charge voltage is greater than the preset limit.

19. The method of claim 11, wherein the steps of the method are implemented in software.

20. A method for recovering a lead acid battery that has an internal resistance of a normal limit value and a recoverable limit value, comprising the steps of:

measuring the battery internal resistance;

indicating that the battery is to be discarded if the measured internal resistance exceeds the recoverable limit value;

charging the battery if the measured internal resistance is greater than said normal limit value and less than said recoverable limit value;

charging the battery with a charge voltage;

measuring the battery current;

increasing the charge voltage if the battery current has not reached a first current limit.

21. The method of claim 20, further comprising the steps of decreasing the charge voltage if the battery current has reached a second current limit.

22. The method of claim 21, following the decreasing step, further comprising the step of continuing to decrease the charge voltage if the decreased charge voltage has not reached the first current limit.

23. An apparatus for recovering a lead acid storage battery comprising:

a variable current source for supplying current to the battery;

means for measuring battery voltage;

means for measuring battery current;

a programmable computer for receiving data of the measured battery voltage and measured battery current, and for controlling the output amount of said variable current source;

said computer computing the battery internal resistance and if the internal resistance is greater than a normal limit value and less than a recoverable limit value, operating said variable current source in sequence to the measured battery voltage and measured battery current to increase the charge current if the battery voltage has reached a minimum voltage and began to decrease.

24. The apparatus of claim 23, further comprising a control relay implementing normal charging of the battery.

25. The apparatus of claim 24, further comprising a relay module implementing commands from the computer to the control relay.

26. The apparatus of claim 23, further comprising a data acquisition device processing measured voltage and current data from the battery into a form useful by the computer.

27. The apparatus of claim 26, wherein the data acquisition device processes the data using one of the group consisting of analog-to-digital conversion, digital-to-analog conversion, amplification and noise reduction.

28. The apparatus of claim 23, further comprising a thermocouple connected to the battery, the thermocouple measuring a temperature of the battery.

29. The apparatus of claim 28, wherein the computer stops the variable current source from charging the battery if the battery temperature exceeds a tolerable limit.

30. The apparatus of claim 23, further comprising an electronic load connected in parallel with the variable current source for discharging the battery.

31. The apparatus of claim 23, further comprising a diode connected in series with the variable current source for protecting the variable current source from the battery discharging into the variable current source.

32. The apparatus of claim 23, wherein the computer measures the battery internal resistance and directs the variable current source to charge the battery using normal charging if the battery internal resistance is less than a normal limit.

33. The apparatus of claim 23, wherein the computer measures the battery internal resistance and sends a signal to discard the battery if the battery internal resistance is greater than a recoverable limit.

34. The apparatus of claim 23, wherein the computer directs the variable current source to charge the battery using normal charging if the charge is greater than a charge current limit.

35. The apparatus of claim 23, wherein the computer instructs the variable current source to stop charging the battery for a second time period if the battery voltage is still increasing after a first time period has lapsed.

36. The apparatus of claim 23, wherein the computer instructs the variable current source to stop charging the battery for a second time period if the battery has been charging for more than a third time period.

* * * * *

UNITED STATES PATENT AND TRADEMARK OFFICE
CERTIFICATE OF CORRECTION

PATENT NO. : 6,242,886 B1
DATED : June 5, 2001
INVENTOR(S) : Thirumalai G. Palanisamy; Harmohan Singh; Bernard P. Gollomp It is certified that error appears in the above-identified patent and that said Letters Patent is hereby corrected as shown below:

Column 3,
Line 41, change "Fig. 2 is" to -- Figs. 2 and 2A show --

Figure 2B:
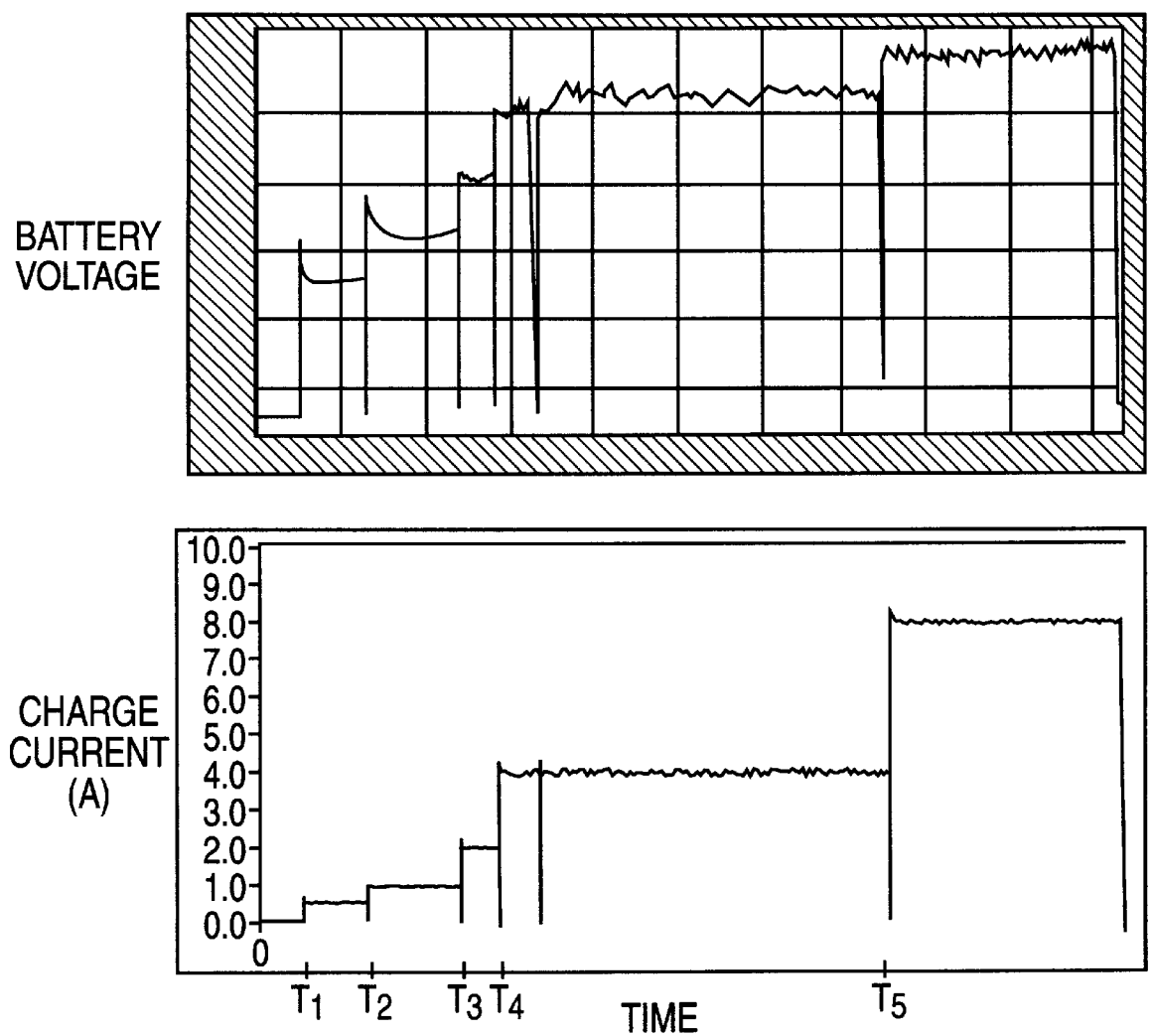
FIG. 2B is a graph illustrating the battery voltage response of a battery being recovered using the method of the present invention.

Column 4,
Line 24, change "Fig. 2A" to -- Fig. 2B --.
Line 26, change "Fig. 2A" to Fig. 2B --.

Column 7,
Line 34, change "2" to -- 2A, 2B --.

Signed and Sealed this

Fifteenth Day of January, 2002

JAMES E. ROGAN
*Director of the United States Patent and Trademark Office*

*Attest:*

*Attesting Officer*